Sept. 22, 1931.  I. C. DREWS ET AL  1,824,262
CHICKEN FEEDER
Filed April 29, 1929   2 Sheets-Sheet 1

INVENTORS
IRVINE C. DREWS
CONRAD E. BOEHM
BY
ATTORNEYS.

Sept. 22, 1931.    I. C. DREWS ET AL    1,824,262
CHICKEN FEEDER
Filed April 29, 1929    2 Sheets-Sheet 2
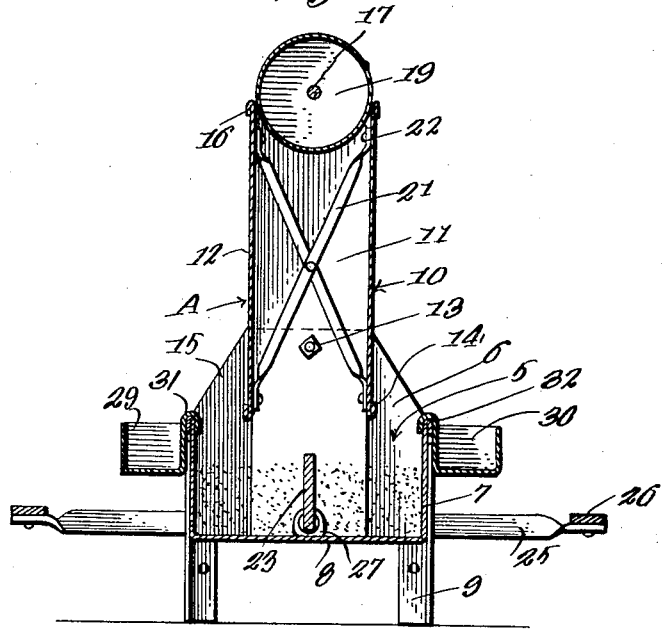
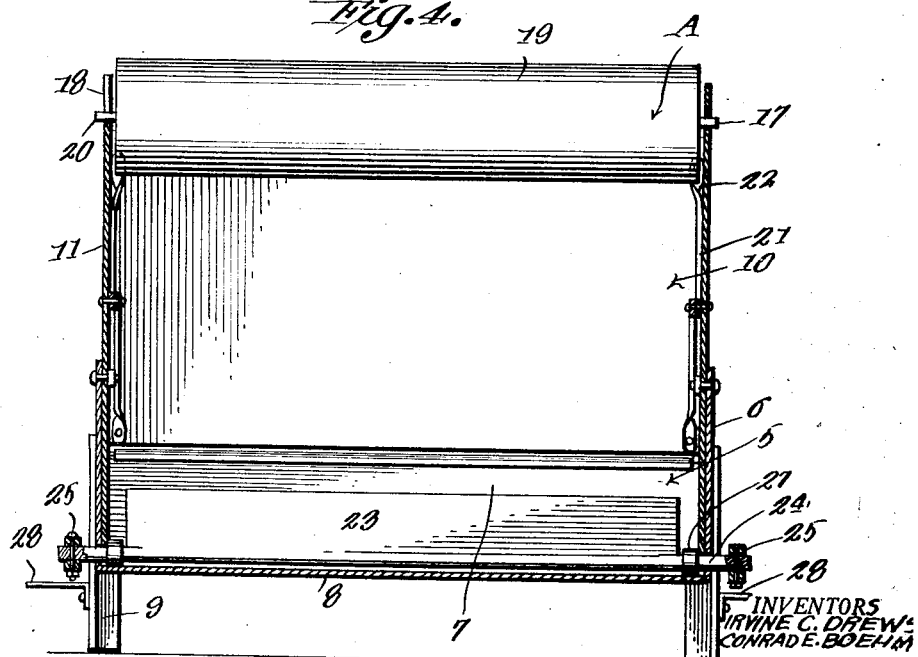

UNITED STATES PATENT OFFICE

IRVINE C. DREWS AND CONRAD E. BOEHM, OF MARSHFIELD, WISCONSIN

CHICKEN FEEDER

Application filed April 29, 1929. Serial No. 358,991.

This invention appertains to feeding troughs and more particularly to a poultry dry mash feeder.

One of the primary objects of our invention is to provide a poultry dry mash feeder embodying a centrally disposed feed hopper with means actuated by the poultry for distributing and forcing the feed into opposite sides of the feed trough.

A further object of our invention is the provision of removable and supplemental waste catching troughs carried by the opposite sides of the main feed trough for catching excess feed dropped by the poultry during the feeding process, the supplemental troughs permitting the waste feed thus caught to be dumped back into the feeding trough.

A further object of our invention is the provision of a novel anti-roost roller detachably associated with the upper end of the hopper, the roller preventing the roosting of poultry on top of the hopper and acting as a closure for the hopper, the removing of the roller allowing the easy filling of the hopper with the feed.

A still further object of our invention is to provide an improved poultry feeding trough of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 3 is a transverse section through the improved device taken on the line 3—3 of Figure 1 looking in the direction of the arrows, and Figure 4 is a longitudinal section through the improved device taken on the line 4—4 of Figure 2 looking in the direction of the arrows.

Figure 1:
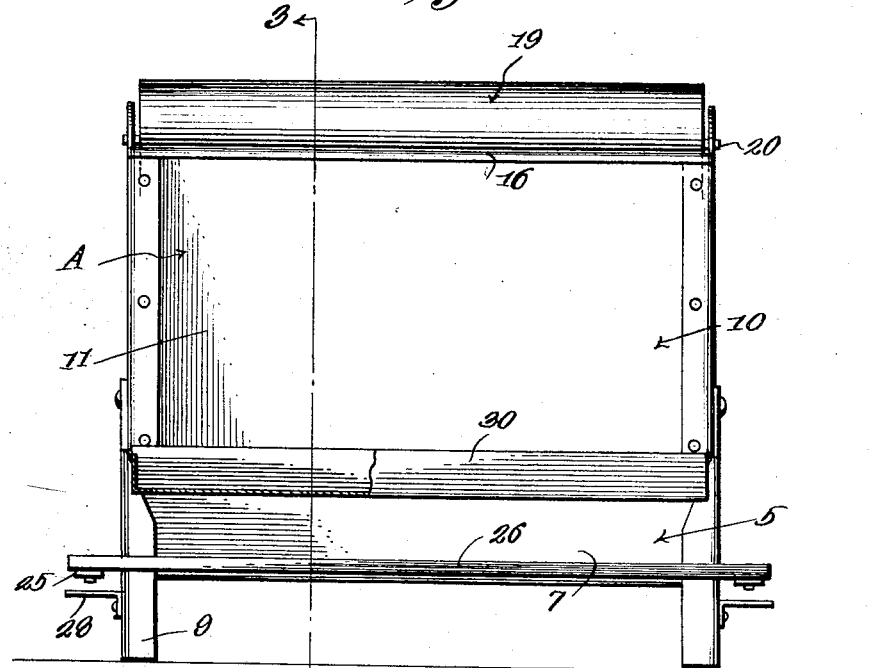
Figure 1 is a side elevation of the improved device with one of the supplemental troughs being shown partly broken away and in section.
Figure 2:
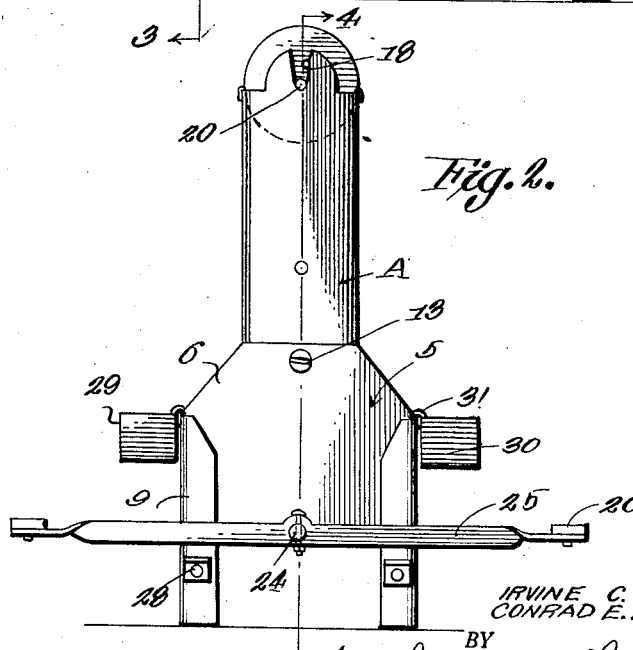
Figure 2 is an end elevation of the improved device.

Referring to the drawings in detail, wherein similar reference characters designate corresponding parts throughout the several views, the letter A generally indicates our improved poultry dry mash feeder which comprises a base or main feeding trough 5 which can be constructed from sheet metal of the desired gage or any other preferred material and this main feeding trough 5 includes the end walls 6, the longitudinally extending side walls 7 and the flat bottom wall 8. The end walls 6 extend an appreciable distance above the side walls 7 and can be tapered toward their upper ends if so desired. The trough can be supported by suitable corner legs 9 if desired and these legs can be of angle iron construction in bracing the corners of the trough or base to form a reinforcement therefor.

Disposed centrally of the base or main feed trough is a longitudinally extending feed receiving hopper 10 which can also be formed of sheet metal, if desired. The hopper 10 extends above the base or feed trough and includes the upstanding end walls 11 and the spaced longitudinally extending side walls 12. As shown, the end walls 11 extend below the side walls 12 and rest upon the bottom wall 8 of the main feeding trough and engage the inner faces of the end walls 6 of the feed trough. The hopper can be detachably secured to the base in any preferred way, such as by the use of bolts 13 which extend through the end walls 11 of the hopper and the end walls 6 of the base or feed trough. The side walls 12 preferably have their lower edges bent back upon themselves as at 14 so as to strengthen the hopper and to eliminate the formation of sharp cutting edges and these walls terminate slightly below the upper edges of the longitudinal side walls 7 of the feed trough. The hopper is considerably narrower than the feed trough and thus the side walls 12 of the hopper are spaced from the side walls of the feed trough forming longitudinally extending feed slots or openings 15 on each side of the hopper and feed trough. The upper edges of the side walls 12 of the hopper 10 can likewise be bent back upon themselves as at 16 in order to eliminate the formation of sharp cutting edges and the end walls extend slightly above the top edges of the side walls 12 and are provided respectively with a bearing opening 17 and a bearing notch 18 for a purpose which will now be described. If desired, the side walls 12 can be made tapering slightly toward their upper ends.

The open upper end of the hopper serves as means for facilitating the filling of the same with the dry mash and the upper end of the hopper is adapted to be closed by a novel means for preventing the roosting of the poultry thereon. This cover comprises a hollow cylindrical roller 19, the diameter of which is substantially equal to the width of the hopper and the opposite ends of the roller 19 can carry bearing pins 20 which are adapted to fit within the bearing opening 17 and the bearing notch 18. It is obvious that when a fowl endeavors to perch upon the roller, the same will roll and thus force the fowl off of the same. As stated the roller also functions as a cover and the same can be readily removed when it is desired to fill the hopper with the feed.

The hopper can be braced in any preferred way if desired, and as shown, we provide diagonal cross end braces 21 which can be constructed of strap iron and these braces are placed in engagement with the end walls and have their opposite terminals bent at right angles to provide attaching feet 22 which are riveted or otherwise secured to the side walls 12.

In order to insure the distribution of the feed into each side of the hopper and the forcing of the feed on each side, we provide an agitating and forcing blade 23 which extends longitudinally of the trough 5 adjacent to the lower end thereof and at the transverse center thereof. The opposite ends of this blade 23 carry end shafts 24 which extend through the lower ends of the end walls 11 of the hopper and the end walls 6 of the trough and these shafts have secured thereto transversely extending supporting or rock bars 25 which extend equi-distantly from the opposite sides of the shafts. These rock bars 25 or levers have their ends connected by longitudinally extending strips or platforms 26 upon which the fowls are adapted to perch when feeding from the trough openings or slots 15. We prefer to braze or otherwise secure on the shafts 24 bearing rollers or disks 27 which rest on the bottom wall 8 of the hopper, which facilitates the turning or swinging of the blade 23 as will be now described.

It can be seen that as the fowls perch upon the platforms or strips 26, the weight of the fowls will rock the levers or bars 25 thus rocking the bars one way and then the other causing the swinging of the blade and the forcing of the feed into each side of the feed trough and under the feed openings.

This forms an important feature of our invention and it is to be noted that the construction is of an exceptionally simple and durable character and embodying a minimum number of operative parts.

In order to limit the swinging movement of the levers or bars 25 we provide stop brackets 28 which are secured to the corner legs 9 below the said levers or bars 25 and when these bars are rocked beyond a predetermined point, the same will engage the brackets which will prevent further swinging movement thereof.

In connection with the trough 5 we provide supplemental feed catching troughs 29 and 30 which are arranged on opposite sides of the main feed trough 5 and the inner edges of these troughs 29 and 30 are provided with hooks 31 which are adapted to hook over the upper edges of the side walls 7 of the trough. As shown, these troughs 29 and 30 are relatively narrow so as not to interfere with the feeding of the fowls from the main trough and the supplemental troughs perform the function of catching any feed dropped by the fowls, thus preventing the wasting thereof. These troughs 29 and 30 can be detached from the main trough to permit the dumping of the feed caught thereby back into the main trough.

If desired, the upper edges of the side walls 7 of the main trough can be bent back upon themselves as at 32 in order to form a reinforcement for these walls and prevent the formation of sharp cutting edges.

Changes in details may be made without departing from the spirit or the scope of this invention, but:

What we claim as new is:

A feeding device for poultry comprising a feed trough, a feed hopper carried by and projecting into the trough and communicating at its lower end therewith, rockable perches carried by the trough, a distributing blade operatively connected with said perches and arranged in said trough, and a removable roller carried by the upper end of said hopper forming a closure therefor at all times.

In testimony whereof we affix our signatures.

IRVINE C. DREWS.
CONRAD E. BOEHM.